Aug. 30, 1949.  C. D. JONES  2,480,657
WATER HEATER
Filed Feb. 17, 1944

INVENTOR.
Chester D. Jones,
BY Edward A. Lawrence
his attorney.

Patented Aug. 30, 1949

2,480,657

UNITED STATES PATENT OFFICE 2,480,657

WATER HEATER

Chester D. Jones, Carnegie, Pa., assignor to Lawson Manufacturing Company, Pittsburgh, Pa., a corporation of Pennsylvania Application February 17, 1944, Serial No. 522,746

4 Claims. (Cl. 122—17)

This invention relates generally to domestic water heaters which employ liquid or gaseous fuel burners and more particularly to domestic water heaters having a submerged combustion chamber wherein the flame is not in direct contact with the liquid.

The principal object of this invention is the provision of a closed domestic water tank having a substantially horizontally disposed combustion chamber connected to an upright flue that passes up through the water in the tank and is vented at the top.

Another object is the provision of a horizontally disposed combustion chamber adjacent the bottom of a closed water tank and which is vented by a flue passing up through the water tank.

Another object is the provision of an L-shaped combustion chamber and flue submerged within a closed water tank of a domestic water heater and wherein the burner opening of the combustion chamber is disposed at a higher elevation than the inner end of the combustion chamber for the purpose of collecting and retaining condensation which is subsequently evaporated when the heater is warmed up.

Another object is the provision of a horizontally disposed combustion chamber for a domestic water heater having a sump to entrap and retain the moisture condensed from the products of combustion until it is removed by evaporation.

Another object is the provision of a domestic water heater having an enclosed horizontally disposed combustion chamber integrally connected to a vertically disposed flue that passes up through the tank of the water heater from whence it is vented.

Another object is the provision of a domestic water heater tank having an enclosed and horizontally disposed combustion chamber connected to a vertical flue passing up through the tank and a burner producing a horizontally disposed cylindrical flame for substantially the full length of the combustion chamber.

Another object is the provision of an improved and highly efficient domestic water heater.

Another object is the provision of an enclosed water heater having a fully submerged flue and combustion chamber, the length of the flue being at least twice the length of the combustion chamber.

Another object is the provision of a water heater having a combustion chamber and a ring head burner arranged to limit the amount of secondary air admitted around the perimeter of the head to induce the flow of a sufficient amount of secondary air through the center of the head to produce a hollow cylindrical flame that is projected horizontally into the combustion chamber.

Another object is the provision of a water heater having a combustion chamber at the lower end thereof and which is provided with a down draft burner that eliminates flash back and noise of lighting and extinguishing when the gas is quickly turned on or off.

Another object is the provision of a water heater having a combustion chamber adjacent the lower end thereof and which is provided with a burner for projecting a substantially horizontal flame into the combustion chamber and having its Venturi tube and mixing chamber above the level of the burner.

Other objects and advantages appear in the following specification and claims.

A practical embodiment illustrating the principles of this invention is shown in the accompanying drawing wherein.

Figure 1:
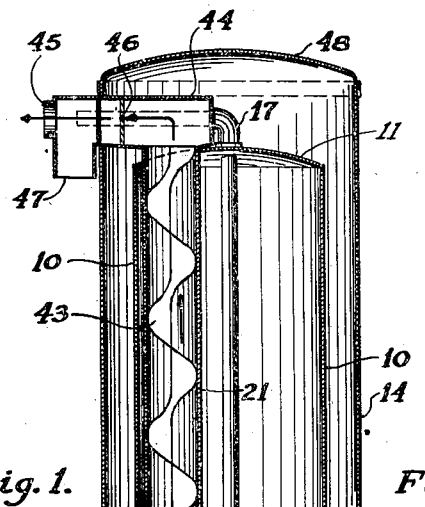
Fig. 1 is a vertical section of the domestic water heater comprising this invention.

Referring principally to Fig. 1 of the drawing, the domestic water heater comprises the tank 10 closed at the top and bottom by the heads 11 and 12 and supported by the circular base 13. The base 13 also supports the outer shell or jacket 14 which in Fig. 1 is concentric to and in spaced relation with the tank 10 to provide space for receiving insulating material. The insulating material would completely surround the tank 10 as there is space under the bottom head 12 and between the back wall of the control chamber 15 formed in the front of the shell 14. The control chamber 15 is enclosed by the cover 16 which is arranged to snap into place and is readily removable. The cover 16 is open at the bottom to admit air, as indicated by the arrows.

Water is admitted to the tank 10 through the pipe 17 which extends down into the tank and terminates adjacent the lower end thereof, as indicated in Fig. 1. Heated water is removed from the top of the tank through the pipe 18.

Figure 4:
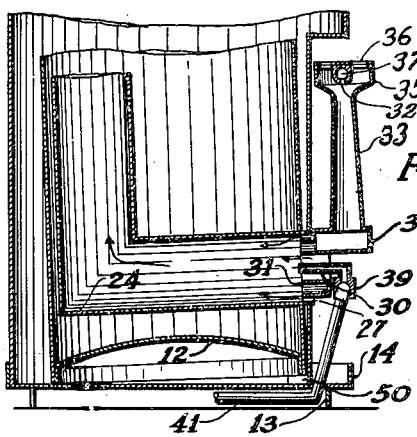
Fig. 4 is a modification of the structure of Fig. 1 showing an enlarged sectional view of a portion of the combustion chamber to illustrate the relative positions of the burner, the pilot light and the thermostat.
Figure 3:
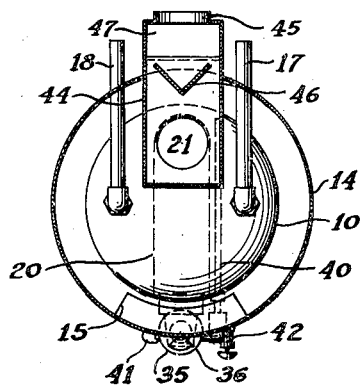
Fig. 3 is a sectional view taken on the line 3—3 of Fig. 2.

The combustion chamber 20 and flue 21 are tubular members welded together at substantially right angles to one another along the seam 22 to form a unitary L-shaped member 23 which comprises a principal improvement of this invention. An opening is provided in the upper head 11 to receive the top of the flue 21 and in the side walls of the tank 10 adjacent the bottom to receive the outer end of the combustion chamber 20. The L-shaped member 23 is inserted in the tank 10 before the bottom head 12 is attached and the end of the flue 21 is welded to the head 11. The end of the combustion chamber 20 is likewise welded to the side wall. The tank is then watertight and completely closed and the combustion chamber and flue are submerged. If the angle between the combustion chamber 20 and the flue 21 is 90°, as shown in Fig. 4, or greater, any condensation formed in the L-shaped member 23 will run out the front end of the combustion chamber 20, if the latter is horizontal, where it may drop to the floor and be conveyed to a drain. However in Fig. 1 the angle between the combustion chamber 20 and the flue 21 is approximately 87°, giving the former a 3° slope inwardly toward the flue. This slope is sufficient to form a sump or trap 24 in which condensation collects forming a small pool of water. Ordinarily the condensation forms when the water in the tank and the L-shaped member 23 are cold, when the heater is first lighted, but after the heater is warmed up the condensation stops forming and any water that has collected in the sump 24 subsequently evaporates and passes out of the flue with the products of combustion. This is an important feature of this invention.

The burner 25 is constructed for burning gas and is inverted because of the proximity of the combustion chamber 20 to the floor. This arrangement provides several advantages. The burner head 26 is made in the shape of a ring having radially projecting and annularly spaced lugs 27 which center the ring in the end of the combustion chamber to limit the amount of secondary air and to cause it to flow completely around the head into the combustion chamber. The ring head 26 also has a central opening 28 for the admission of secondary air and through which the pilot light 30 extends. The annular opening 31 of the burner head through which the gas is discharged is arranged to receive alternate corrugated and flat ribbons which are wound together and placed in the opening 31 and form the ports through which the gas flows in passing out the annular burner head opening 31. This type of port is referred to as a ribbon gas port.

The opening 31 of the burner ring head 26 is connected to the large end of the Venturi tube 33 by the distribution box 34. The bell inlet chamber 35 is formed on the small or throat end of the Venturi tube 33 and is provided with the usual primary air shutter 36 and a transverse pipe 37 provided with a gas discharge port 32 disposed axially of the throat of the Venturi tube 33. Gas is supplied to the burner pipe 37 through the thermostat valve 38 which admits gas to the burner when the temperature of the water as measured by the thermostat 40 is less than the predetermined setting of the thermostat control. The thermostat 40 is located adjacent the opening of the long inlet pipe 17.

The gas is supplied through the gas line 41 which passes from the back of the heater under the tank through the base 13 and extends upwardly into the control chamber 15 and is connected to and passes through the pilot valve 39 from which the pilot light gas is tapped. The other end of the pilot valve is connected to the receiving end of the thermostat control 38. It will be noted that with this physical arrangement of the burner, pilot light and thermostat control the gas line is materially shortened, which is another important object in this invention.

A drain cock 42 is located adjacent the bottom of the control chamber 15 adjacent the lower head 12.

The flue 21 is provided with the helical baffle member 43 which is dropped into position before the down draft preventer 44 is secured to the top of the flue 21. The bottom of the down draft preventer preferably slopes downwardly toward the flue 21 and the chimney connection 45 is somewhat higher. The down draft preventer 44 is sealed with the top of the flue so that any moisture that may collect in this portion of the apparatus will trickle down the flue 21 to the sump 24. A V-shaped baffle member 46 is placed in the down draft preventer between the flue 21 and the downwardly open vent 47. The baffle 46 directs any down draft from the chimney to the vent 47 and thus prevents the draft from passing down the flue 21 where it may blow out the flame or pilot light.

Figure 2:
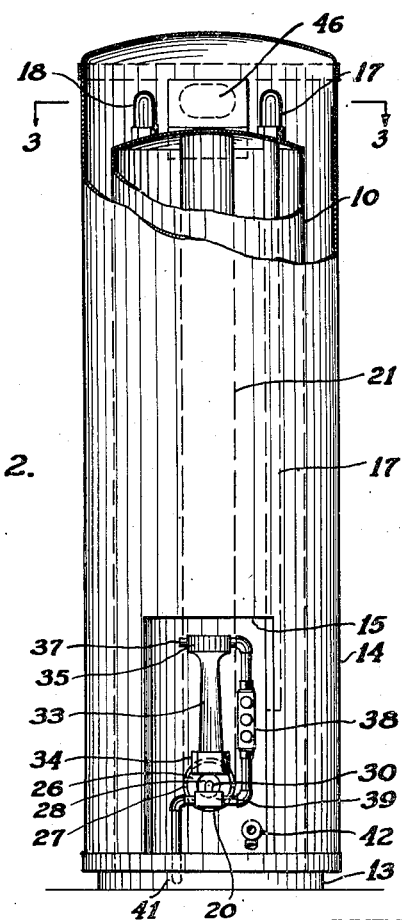
Fig. 2 is a front elevation of the water heater with a portion shown in section.

The down draft preventer 44 and the inlet and outlet water pipes 17 and 18 are all enclosed by the top 48 of the shell 14, which may also be packed with insulation, and these parts are thus protected and hidden from view when facing the front of the heater, as shown in Fig. 2.

In Fig. 4 the combustion chamber is shown to be disposed 90° from the flue and the sump 24 is formed by raising the front wall of the tank relative to the back. This may be accomplished by placing a wedge 50 under the front edge of the tank which holds the whole tank tilted on the base 13. The degree of tilting does not vary the amount of insulation between the tank and its outer shell enough to materially change the effect of the insulation around the tank, yet the angle of tilting is sufficient to produce the sump 24 which collects and holds the condensation.

The sump 24 collects and holds the condensation in the combustion chamber and the water is subsequently evaporated when the water in the tank and the L-shaped member 23 become heated. This structure eliminates the necessity of providing a drip pan which in the ordinary hot water heater of this character is remote from the heat and cannot be evaporated but must be emptied periodically or it will drip on the floor.

The entire combustion chamber 20 and flue 21 are immersed in the water of the tank 10 and the former is closely adjacent but spaced from the bottom head 12 and the latter from the back wall of the tank. The only heat lost by conduction from the L-shaped member is through the annular welded joints between the legs 20 and 21 of the L-shaped member 23 and the tank, which joints are remote from the hottest portion of the L-shaped member. This construction provides an efficient heat transfer between the L-shaped member and the water being heated and produces a highly efficient water heater. This is an important object of this invention and tests have proven that this heater is more than twenty percent more efficient than heaters of this class.

The burner also contributes to this improved efficiency. The annular burner opening with the ports formed by the corrugated and flat ribbons produces a cylindrical flame that projects substantially the full length of the combustion chamber. This cylindrical flame is held in spaced relation from the wall of the combustion chamber by the flow of secondary air around the outside of the burner ring head 26 and the flame maintains this spacing and cylindrical shape regardless of the downward slope of the combustion chamber. The large central opening of the burner ring head maintains the cylindrical flame hollow and properly shaped for the full length thereof. When the lighted burner is not in the combustion chamber the flame tends to point which illustrates the function of the central opening 28. The shape and location of the gas distribution box 34 aids in discharging the gas uniformly around the annular opening 31 of the burner head 26. Again the fact that the bell inlet chamber 35 opens upwardly in place of horizontally outward or downward improves the operation of the burner. The burner may be referred to as an inverted or down draft burner in view of the fact that the Venturi tube and the air mixer are above the level of the burner head. The inverted or down draft burner eliminates flash back and noise of ignition or extinction of the flame which may occur when the burner head is above or at the same level as the mixing chamber and Venturi tube and the gas is quickly shut off or on. The velocity of the gas within the inverted burner when shut off is aided by the natural draft and the rising of the lighter than air gas flowing to the burner port. If the gas is shut off manually, the action is slow and the diminishing supply of the gas has less effect on the flash back and noise in any type of burner.

With the down draft or inverted burner the velocity of the remaining gas within the burner when shut off is impeded by the tendency of the gas to rise or flow away from the burner head and the natural draft is also impeded. Thus the remaining gas is retarded and thus provides the same effect as slowly turning off the gas manually and there is no flash back or noise produced. The ribbon gas port is also believed to contribute to this improvement. The ribbon gas port offers enough resistance to flow to induce small straight flames issuing from the annular burner opening. In comparison drilled burner ports offer a greater resistance to flow as there are fewer openings in a given area of the burner head. Thus the inverted venturi has the tendency to induce a slight draft from the head to the mixing chamber when gas is not being discharged in the opposite direction. These factors also contribute to the efficient operation of the heater and are important objects of this invention.

This heater produces a material gradation in the temperature of the water from the vicinity of the combustion chamber to the top of the heater, the water at the top being the hottest. In the ordinary heater of this character there are only a few degrees difference in temperature. This fact, together with the proximity of the flue to the side wall of the tank, provides a liquid column therebetween that is heated to a higher temperature which induces a circulation of the water within the tank.

I claim:

1. In a water heater of the character described, the combination of an enclosed water tank having inlet and outlet openings, a combustion chamber sloping downwardly from the side wall into the tank to form a sump for collecting and retaining condensation, a flue connected at its lower end to the inner portion of the combustion chamber and extending upwardly within the tank and through the upper wall thereof, the combustion chamber and flue being sealed with one another and with the walls of the tank where they pass therethrough.

2. In a water heater of the character described, the combination of an enclosed elongated water tank having inlet and outlet openings, a combustion chamber and flue in the form of an L-shaped tubular member consisting of short and long sections connected in communication with one another, said L-shaped member being positioned within the tank with the long section disposed longitudinally and the transverse short section sloping downwardly from its free end forming a sump to collect and retain condensation, and means for securing the sections adjacent their free ends to the side and end walls of the tank to connect their bores to the exterior and support the L-shaped member immersed in the water within the tank.

3. In a water heater of the character described, the combination with an enclosed water heater tank having inlet and outlet openings for admitting and removing water therefrom, of an L-shaped member making up a combustion chamber and flue within the enclosed tank and having exterior openings for the supply of burning fuel and the removal of products of combustion, and means for supporting the tank to slope the combustion chamber downwardly and inwardly to form a sump for the collection of condensation.

4. The structure of claim 3 characterized in that the sections of the L-shaped member are disposed at right angles to one another.

CHESTER D. JONES.

REFERENCES CITED

The following references are of record in the file of this patent:

UNITED STATES PATENTS

| Number | Name | Date |
|---|---|---|
| 855,410 | Oleson et al. | May 28, 1907 |
| 1,144,783 | Rector | June 29, 1915 |
| 1,790,454 | Arrowsmith | Jan. 27, 1931 |
| 1,871,108 | Burnett | Aug. 9, 1932 |
| 1,935,632 | Handley | Nov. 21, 1933 |
| 1,953,590 | Cone | Apr. 3, 1934 |
| 1,954,873 | Gwathmey | Apr. 17, 1934 |
| 1,995,934 | Mangold | Mar. 26, 1935 |
| 2,041,313 | Winder | May 19, 1936 |
| 2,226,816 | Hepburn | Dec. 31, 1940 |
| 2,251,111 | Brown | July 29, 1941 |
| 2,369,235 | Jaros | Feb. 13, 1945 |

FOREIGN PATENTS

| Number | Country | Date |
|---|---|---|
| 176,852 | Switzerland | Nov. 1, 1935 |